United States Patent [19]

Liebowitz

[11] 3,959,151

[45] May 25, 1976

[54] CONTINUOUSLY OPERATING SEDIMENTATION TANK WITH PIER SUPPORTED RAKE STRUCTURE

[75] Inventor: Bernard Liebowitz, Stamford, Conn.

[73] Assignee: Dorr-Oliver Incorporated, Stamford, Conn.

[22] Filed: Feb. 7, 1975

[21] Appl. No.: 547,820

Related U.S. Application Data

[63] Continuation-in-part of Ser. No. 473,654, May 28, 1974, abandoned.

[52] U.S. Cl. ............................... 210/528; 74/425; 74/665 R; 308/207 R
[51] Int. Cl.² .................................... B01D 21/18
[58] Field of Search ........... 210/523, 525, 528, 529, 210/530, 531; 74/425, 665; 308/207

[56] References Cited

UNITED STATES PATENTS

| 3,241,682 | 3/1966 | Coultney et al. | 210/528 |
| 3,295,835 | 1/1967 | Klopper | 210/528 |
| 3,498,468 | 3/1970 | Raynor | 210/528 |
| 3,539,051 | 11/1970 | Stone | 210/528 |

FOREIGN PATENTS OR APPLICATIONS

| 466,862 | 6/1937 | United Kingdom | 210/528 |
| 729,462 | 5/1955 | United Kingdom | 210/528 |

*Primary Examiner*—Theodore A. Granger
*Attorney, Agent, or Firm*—Theodore M. Jablon; Burtsell J. Kearns

[57] ABSTRACT

Continuously operating sedimentation tank with center pier supported rake structure rotated by a drive head featuring an improved hydrostatic bearing, of compact construction wherein the bull gear is shaped to conform to an improved arrangement of vertical load supporting hydrostatic bearing faces, and radial hydrostatic bearing faces, wherein the base structure of the drive head is a unitary casting embodying an annular reservoir for collecting the hydrostatically spent operating oil, together with improved torque transmitting and weight supporting connecting means between the bull gear and the surrounding top end portion of the vertical cage portion of the rake structure.

31 Claims, 23 Drawing Figures

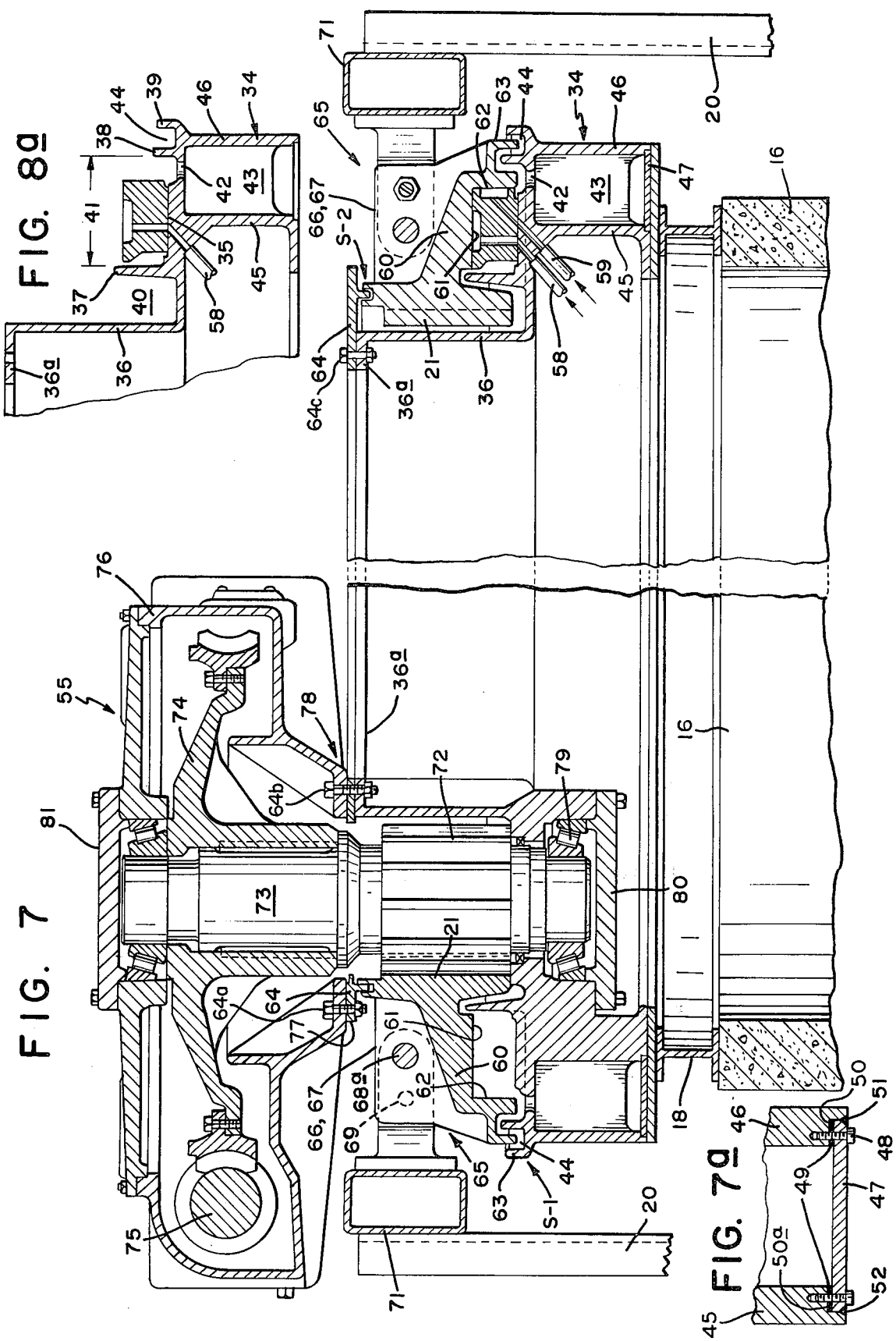

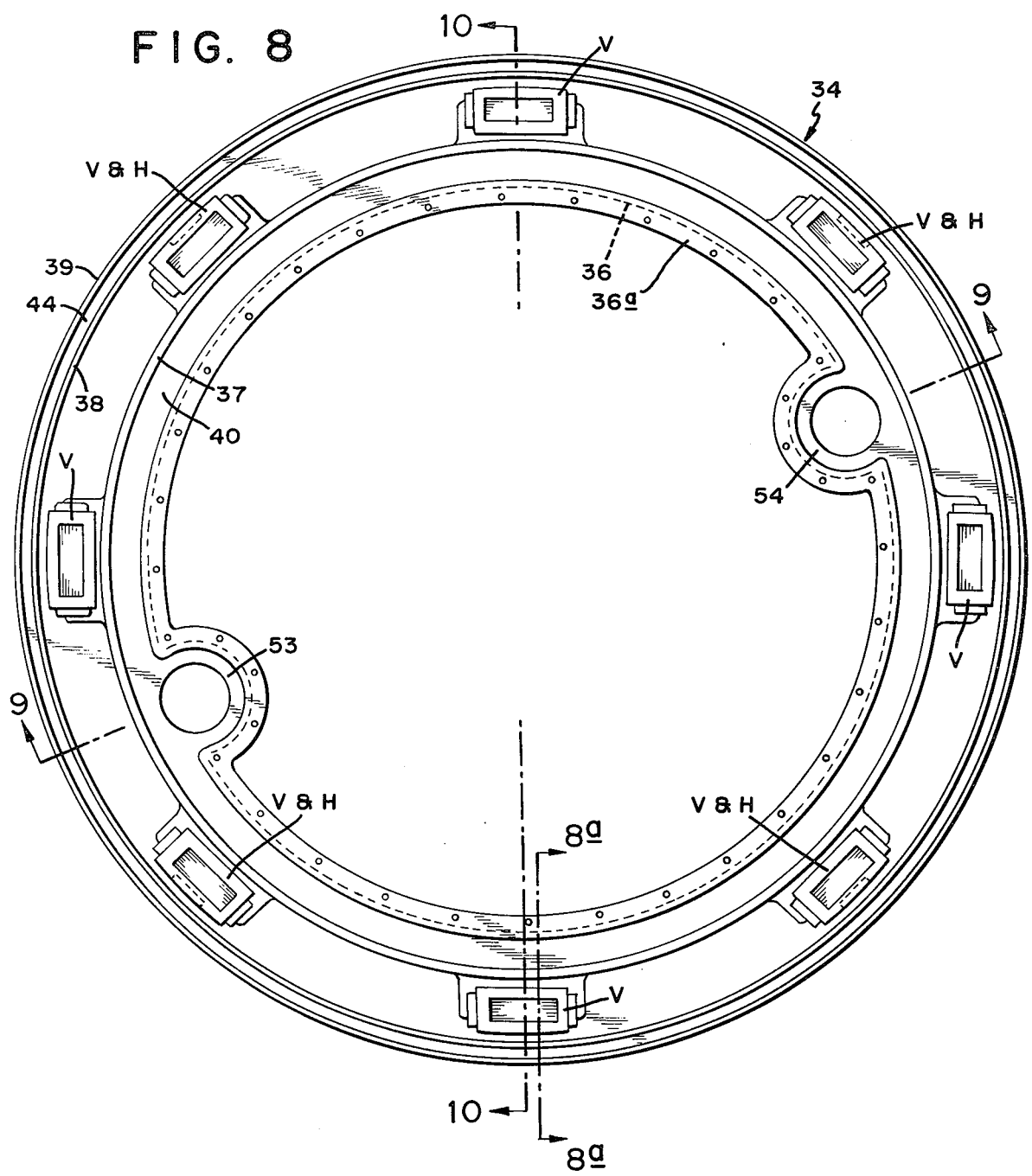

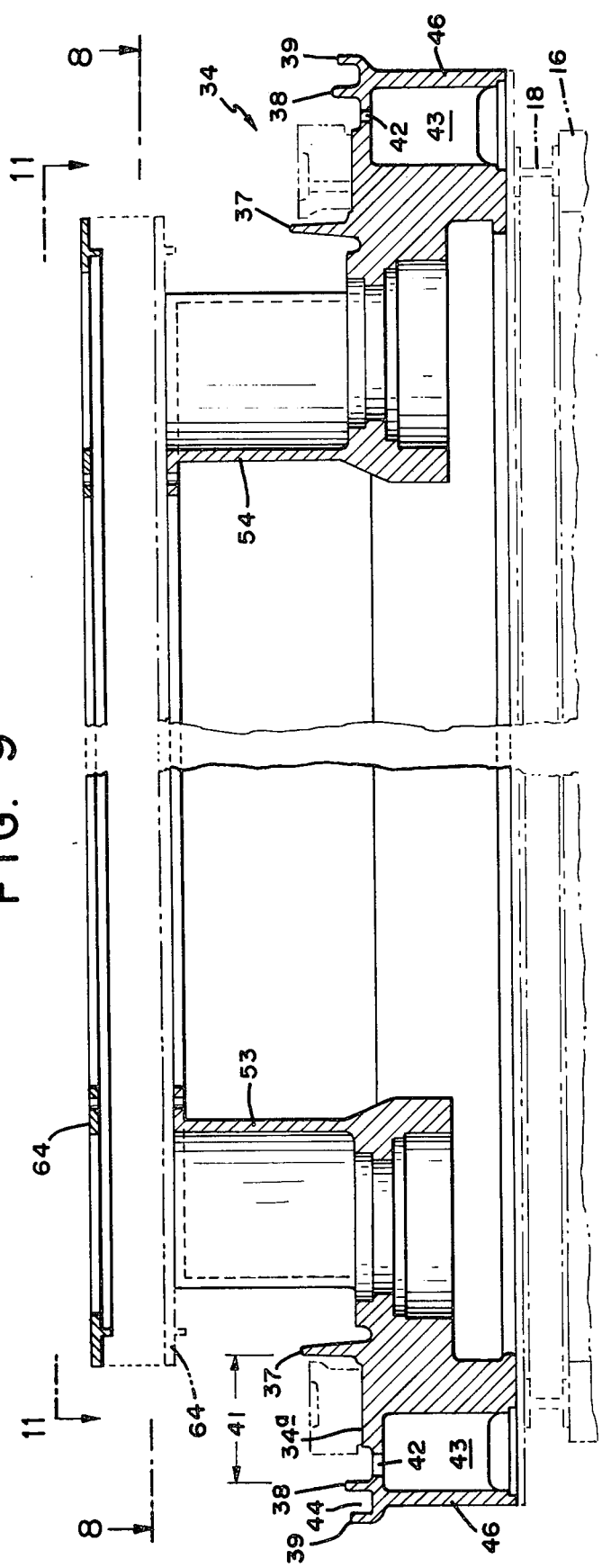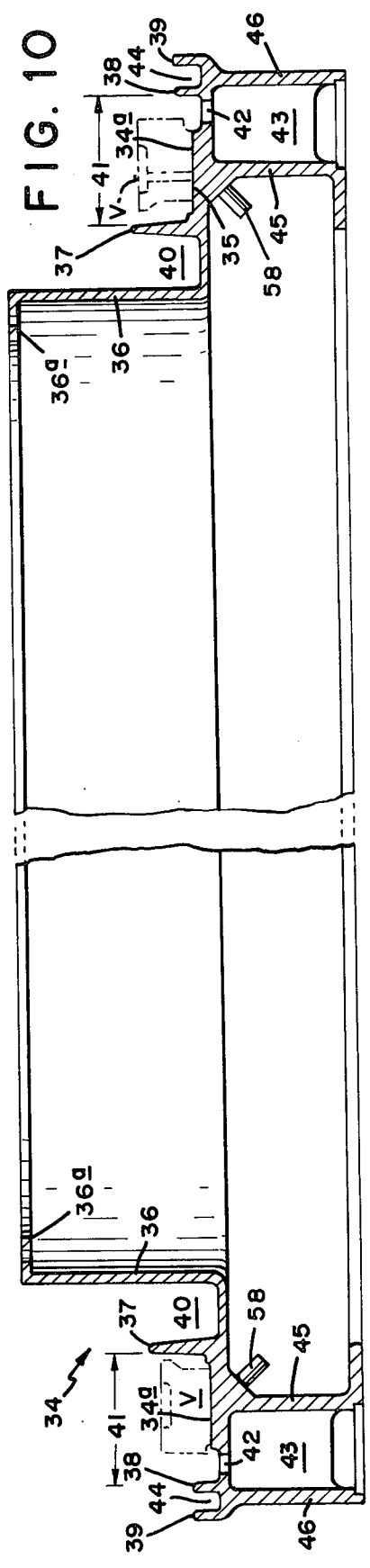

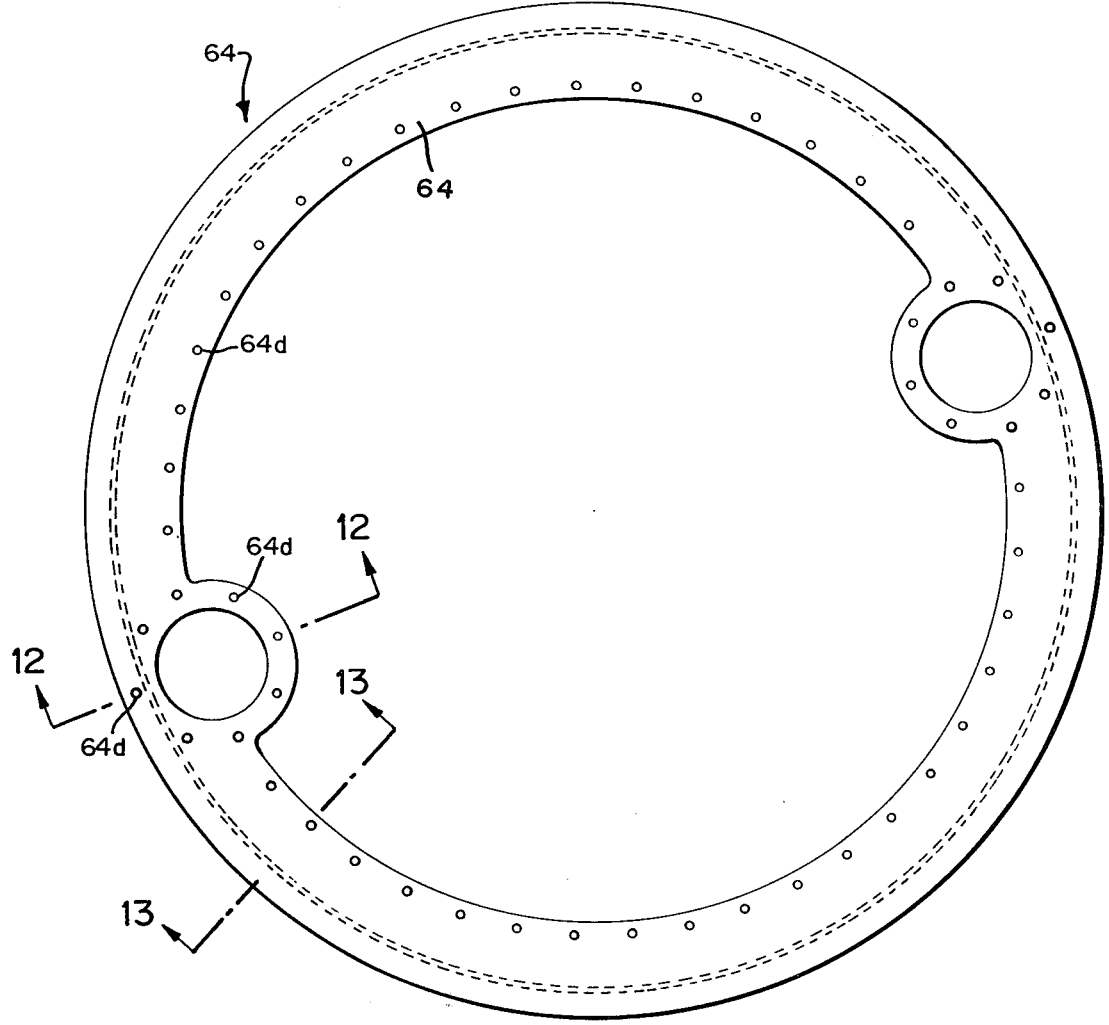
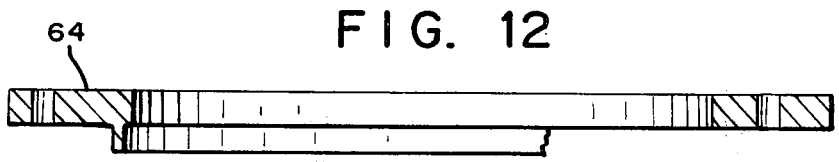
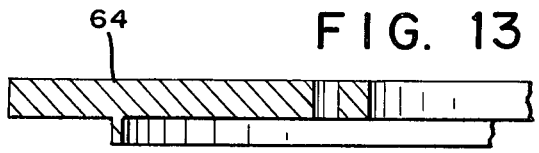

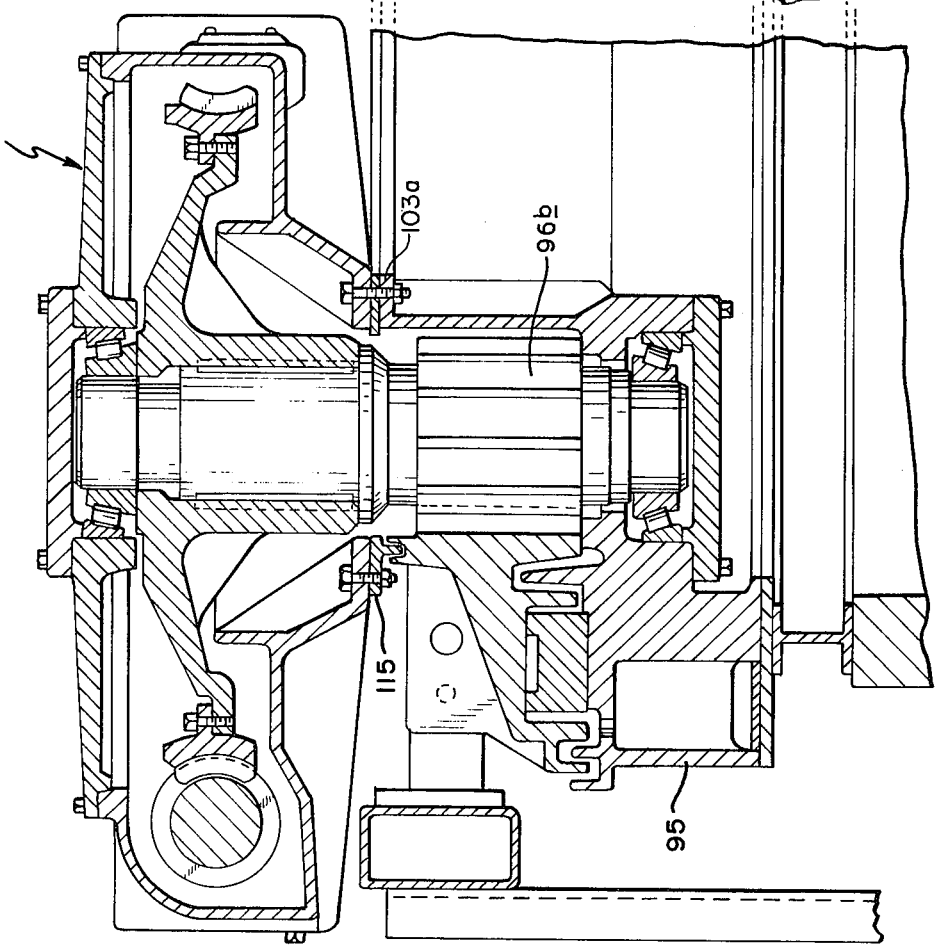

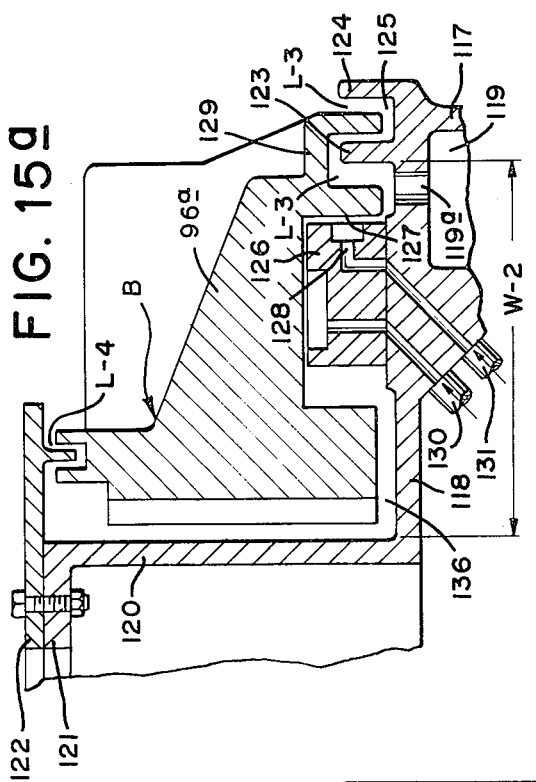
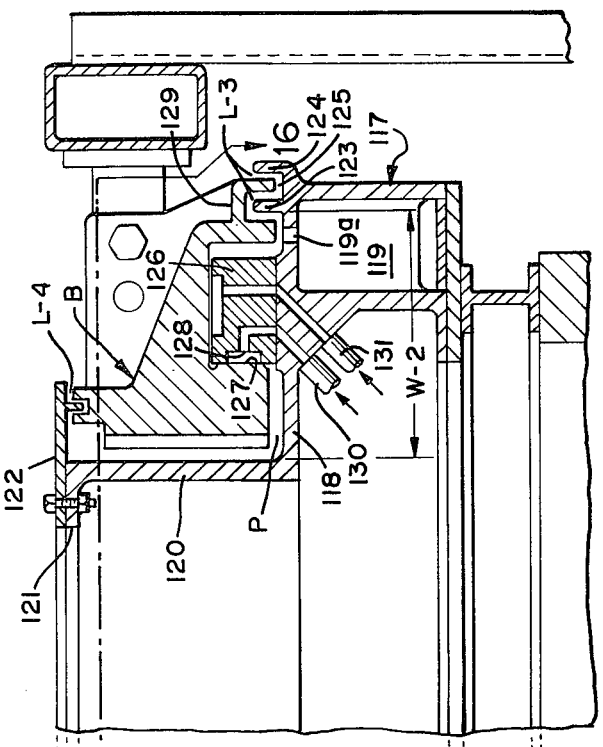
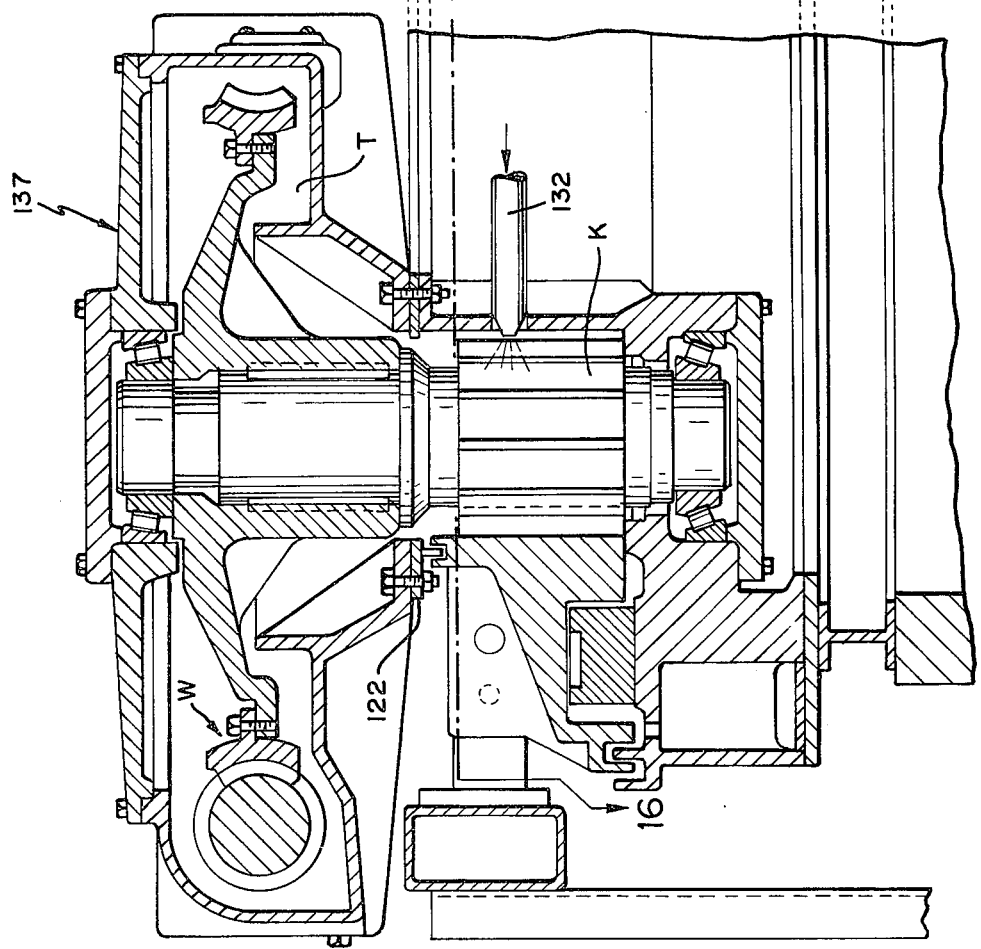
FIG. 15a
FIG. 15

CONTINUOUSLY OPERATING SEDIMENTATION TANK WITH PIER SUPPORTED RAKE STRUCTURE

This is a continuation-in-part application of application Ser. No. 473,654 filed May 28, 1974, now abandoned.

BACKGROUND OF THE INVENTION

This invention relates to continuously operating sedimentation tanks of the type wherein a sludge conveying rake arm structure is supported for rotation about a vertical axis upon a center pier.

The rake arm structure may be of a kind that comprises a central vertical cage portion surrounding the pier, and a plurality of horizontal rake arms extending from the cage portion, each arm being provided with a series of sediment engaging plowing blades. Rotation imparted to the rake structure would cause the bladed arms to convey the sediment or sludge over the tank bottom to an annular sludge collecting zone or sump surrounding the pier, for discharge therefrom by a sludge withdrawal pump.

The upper end of the cage portion has fixed thereto a bull gear concentric with the vertical axis of rotation. This gear is supported by an annular bearing structure mounted concentrically upon the top end of the pier. The bearing is constructed and arranged for sustaining the vertical load of the rake structure, while also capable of absorbing radial stabilization pressures.

One or more interbalanced pinion drive units incorporated in the bearing structure impart the required driving torque to the bull gear and thus to the rake structure for moving the sludge to the discharge zone around the pier.

More in particular this invention is concerned with mounting upon the pier a drive head of the kind whereby the rake structure is supported floatingly or hydrostatically upon horizontal oil pressure areas or pads spaced from one another in an annular trough structure or frame or base.

Provision is also made for radially facing oil pressure areas or pads in the trough structure, for radial stabilization guidance of the rake structure.

Such hydrostatic bearing arrangements for the rake structure are free of mechanical wear and tear, while avoiding problems of manufacturing accuracy and wear and tear or possible failure, as may be encountered with large diameter mechanical ball or roller bearings.

With the improved and simplified version, according to this invention, the range of applicability of the present bearing construction is economically applicable within a wide range of sizes or bearing diameters.

A forerunner of an hydrostatically supported and guided rake structure is disclosed in U.S. Pat. to Raynor No. 3,498,468, wherein an annular hydrostatic bearing or drive head of large diameter, is mounted atop a caisson type hollow center pier. The drive head in the earlier construction comprises an annular runner having torque transmitting connection with the vertical cage structure, concentric therewith. The runner has at the bottom an horizontal annular bearing face whereby the weight of the rotating rake structure is supported hydrostatically upon the oil pressure bearing pads through an oil film supplied by the oil pressure pads. A cylindrical bearing face cooperates with radial hydrostatic bearing pads. The bull gear itself is connected to the top of the annular runner which latter thus represents a torque transmitting connection between the bull gear and the rake structure.

The interior of the caisson structure of the pier provides room and access to various accessory equipment, such as the sludge pump located at the bottom of the pier. The intake end of this pump communicates directly with the sludge collecting zone surrounding the foot end of the pier, thus allowing for gravity intake of the sludge under the static head of the liquid body in the tank.

Thus, the sludge pump needs to deliver only against a moderate pressure head, upwardly through the open central area surrounded by the annular drive head, and then horizontally across an acess bridge leading from the pier to the peripheral wall of the tank, for further disposal.

Other accessory equipment that can be accommodated within the space available within the caisson structure of the pier, may comprise a standby sludge pump, as well as a pumping system for supplying the required oil pressure to the oil pressure pads, in order that the weight of the rake structure may be supported hydrostatically, or floating upon a film of oil. Also accommodated in the caisson type pier are stairway structures providing access to various operating platform levels.

The annular main trough or base structure containing the oil pressure bearing pads collects the spent hydrostatic pressure oil for return to an oil reservoir. In this base structure, an auxiliary annular trough is connected unitary to the base structure concentric with the main trough, containing a separate bath of lubricating oil for the bull gear and the drive pinions engaging them.

Suitable annular sealing means embodied in such a drive head will protect the oil in the hydrostatic pressure oil system, as well as the oil in the gear lubricating trough, against contamination.

One object of this invention is to provide an improved hydrostatic bearing system or drive head for the pier supported rake structure, that is economically and structurally simplified, and yet of great rigidity, high load carrying capacity and compactness and economically adaptable for a wide range of bearing diameters and torque loads.

For the purpose of attaining the above stated objective, the invention provides a hydrostatic bearing construction for the drive head herein briefly termed a hydrostatic drive head, featuring a specially designed internally toothed bull gear provided with an outer overhanging rim portion the underside of which is shaped to surround the oil pressure pads, so as to be vertically supported, as well as to be radially guided thereby.

Accordingly, this rim portion is formed with a downwardly open annular recess providing an internal horizontal bearing face cooperating with vertical load sustaining oil pressure pads, and also formed with an internal cylindrical bearing face conforming to the curvature of the radially effective guiding oil pressure bearing faces.

Further, according to the invention, the vertical load carrying oil pressure pads have an oil pumping system separate from one that is provided for the radially stabilizing oil pressure pads, providing higher operating pressure for the load carrying pads, and only lower pressure needed for the radial stabilizing pads.

In a preferred embodiment there are twice as many load carrying oil pressure pads than there are radial stabilizing oil pressure pads. On that basis an economical pressure pad arrangement is attainable by having dual purpose oil pressure pads or blocks alternating with single purpose pressure pads or blocks.

In this connection, a dual purpose oil pressure pad or bearing block comprises an horizontal hydrostatic load carrying area, as well as a radially effective stabilizing hydrostatic bearing area, each with its separate oil pressure supply.

The single purpose pressure pad or block provides only hydrostatic support for its portion of the vertical load, but lacks the provision for radial hydrostatic pressure stabilization.

The spent hydrostatic pressure oil from both pressure systems may drain into an annular reservoir or receiver integrated into this base structure in concentric relationship therewith.

Specific features are found in a preferred and compact novel form of the base structure preferably in the nature of a casting of integral construction.

Compactness of this structure and thus of the drive head as a whole is attained also by having the annular base trough structure integral with an annular hydraulic oil reservoir, thus eliminating the need for return connections for the hydraulic oil to a separate reservoir.

This base structure or casting comprises an intermediate annular horizontal body portion or platform portion greatly reinforced by cylindric concentric walls extending therefrom in opposite directions. The upwardly extending walls constitute with said body portions an annular trough structure accommodating the rotating bull gear, as well as the associated stationary system of hydrostatic load supporting pads and of radially effective hydrostatic stabilizing pads. A pair of concentric walls extending downwardly from said annular body portion, constitute together with an annular bottom closure plate, the aforementioned annular reservoir. This annular reservoir greatly contributes to the total rigidity and integrity of the base structure.

According to one embodiment, the annular trough structure comprises two separate concentric troughs for the bull gear and for the hydrostatic pads respectively, whereby the lubrication of the internally toothed bull gear and its drive pinion is effected separate from the operation of the hydrostatic pads.

According to another embodiment the annular trough structure is designed to provide for the use of a single oil supply capable of serving for gear lubrication as well as for the operation of the hydraulic pads. That is to say, such a dual purpose or multi-purpose oil is applied and recirculated to both the gear and the hydrostatic pads.

From the foregoing features of the hydrostatic bearing as far as they pertain to the base structure or load supporting frame, it will be understood that the inner upstanding wall thereof is formed so as to accommodate the drive pinions for the internally toothed bull gear.

According to another feature, a substantially flat horizontal adaptor ring of special construction is bolted to an inwardly overhanging horizontal flange of the inner upstanding wall of the casting. This adaptor ring has an outer diameter large enough to provide an outward annular overhang having annular sealing relationship with the annular top end face of the gear. This inner seal located at an upper level, cooperates with an outer annular seal effective at a lower level between the outer edge portion of the load supporting rim portion of the gear and the adjoining outer peripheral edge of the horizontal annular body portion of the base structure.

This adaptor ring is shaped to match the shape of the base structure, to accommodate the drive pinion extending therethrough. This adaptor ring provides not only the aforementioned inner seal at the upper level, but also a horizontal top reference plane for the mounting thereon of the gear housings of the respective drive pinions.

Still other features are found in the provision of novel torque transmitting and weight supporting connections between the bull gear and the central cage portion of the rake structure.

Other features and advantages will hereinafter appear.

DESCRIPTION OF THE DRAWINGS

FIG. 1a is a greatly reduced diagrammatic vertical sectional view of the settling tank.

FIG. 6 is a partial top view of the drive head derived from FIG. 4, with parts broken away to show the interior of one of the pinion drive units.

FIG. 7 is a further enlarged vertical sectional view of the drive head taken on line 7—7 and through one of the pinion drive units of FIG. 4, showing the cooperative relationship between the oil pressure pads of the base structure and the bull gear hydrostatically supported thereby, and a built-in annular oil reservoir.

FIG. 7a is an enlarged detail view of the bottom closure of the annular oil reservoir.

FIG. 8 is a plan view of the annular base structure of the drive head, showing a system of two different kinds of oil pressure pads in alternation.

FIG. 8a is a part-sectional view taken on line 8a—8a in FIG. 8, showing one of the two kinds of pressure pads.

FIG. 9 is a transverse sectional view of the base structure of the drive head, taken on line 9—9 in FIG. 8, shaped to accommodate the pinion drive units, and also showing an adaptor ring associated therewith.

FIG. 10 is a transverse sectional view of the base structure, taken on line 10—10 in FIG. 8.

FIG. 11 is a top view of the adaptor ring shown in FIG. 9, shaped for the accommodation of the pinion drive units.

FIG. 12 is a detail cross-sectional view taken on line 12—12 of the adaptor ring of FIG. 11.

FIG. 13 is a detail cross-sectional view taken on line 13—13 of FIG. 11.

FIG. 14 shows a modified embodiment of the FIG. 7 construction, showing radially inwardly facing hydrostatic bearing areas on the hydrostatic pressure pads.

FIG. 14a is an enlarged fragmentary enlarged detail view taken from 14.

FIG. 15 shows another embodiment of the drive head arranged for a single oil supply for both the operation of the hydrostatic bearing pads and for gear lubrication.

FIG. 15a is an enlarged fragmentary detail view taken from FIG. 15, showing hydrostatic bearing pads having radially outwardly facing hydrostatic pressure faces.

DETAILED DESCRIPTION

Figure 1:
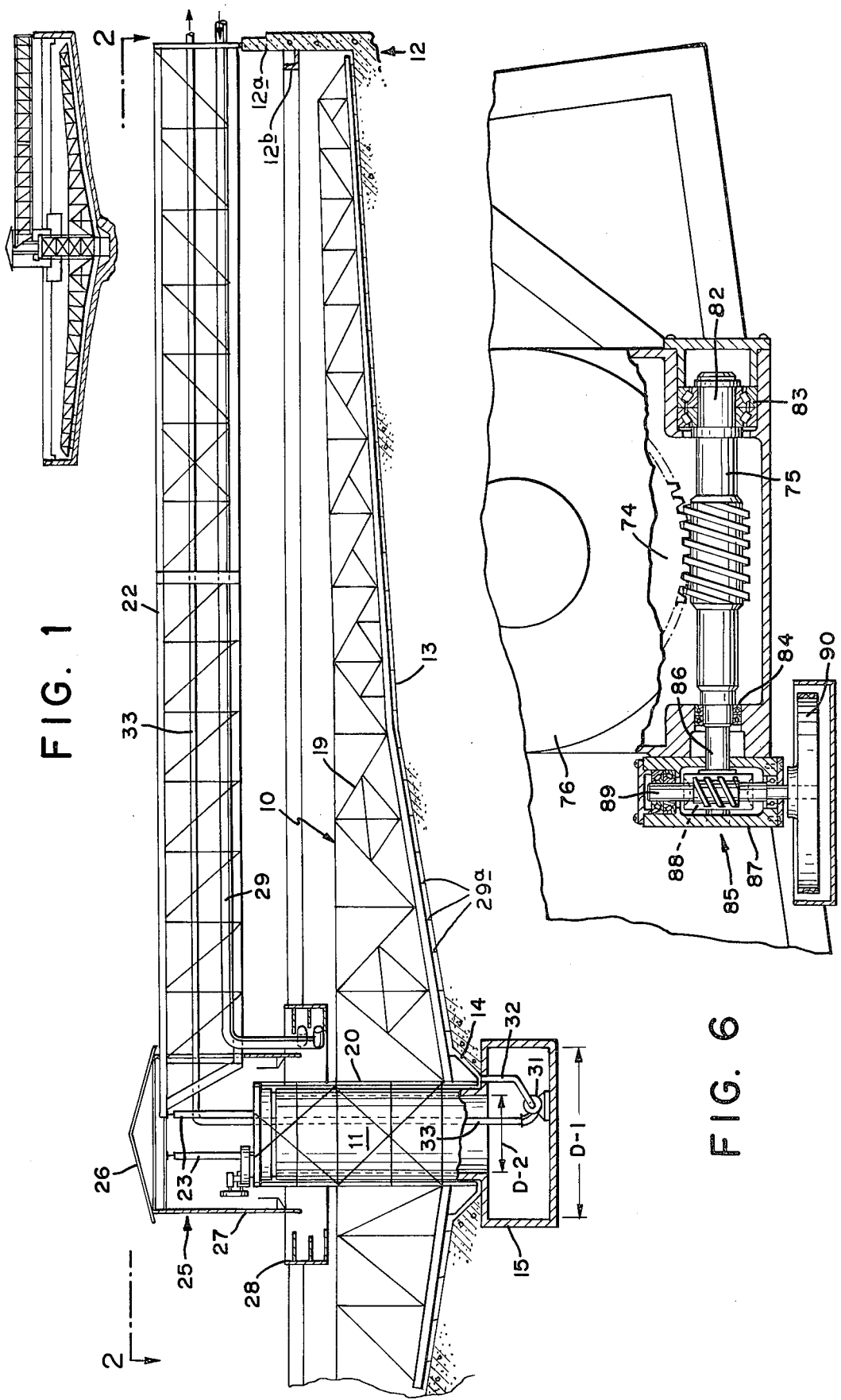
FIG. 1 is a partial vertical sectional view of the pier supported rake structure embodying the invention in a settling tank having a caisson type center pier with sludge pump at the bottom, and feed slurry supplied over an access bridge.

The hydrostatic bearing construction of the drive head of this invention is herein illustrated, by way of example, in connection with a rake structure 10 supported upon a hollow or caisson type center pier 11 which rises from the bottom of a settling tank or basin 12. The tank has a bottom 13 formed with an annular sludge collecting sump 14 surrounding the foot end of the pier. The tank has a peripheral wall 12a provided with peripheral overflow launder 12b.

The hollow caisson type center pier in this example rises from an enlarged bottom section 15 of diameter "D-1", located below the tank bottom, and directly below the aforementioned annular sump. Rising from this enlarged bottom portion and integral therewith is the cylindrical portion 16 of diameter "D-2" of the center pier, and upon which is mounted the drive head by means of a base ring or anchor ring 18 of structural I-beam profile.

The rake structure comprises rake arms 19 extending from a central vertical edge portion 20 surrounding the pier, and which in turn is supported by the drive head on the pier.

The drive head has a driven bull gear 21 (see FIGS. 4, 5, and 7) which in turn supports the weight of the rake structure through the central cage portion, and has torque transmitting connection therewith, furthermore to be described.

The settling tank in this example, has a customary radially extending access bridge 22 the inner end of which is shown to be supported upon columns 23 rising from brackets or projections 24 integral with the concrete structure of the pier. These columns also carry a protective housing or enclosure 25 comprising a roof structure 26 and a depending wall 27 surrounding the drive head and upper end portion of the pier. The lower end 27a of the depending wall is shown to terminate slightly below the liquid overflow level "L" in the tank, thus constituting therewith a liquid seal.

The lower portion of the protective enclosure in turn is surrounded by a feed well 28 shown to be of the kind that operates substantially in the manner and on the principle of the one shown in the aforementioned U.S. Pat. No. 3,498,468.

The access bridge supports a feed pipe 29 that carries feed slurry to the feed well 28. As the rake structure equipped with its usual raking blades 29a is rotated by the drive head, it moves sludge over the tank bottom into the annular sump 14, while the separated or supernatant liquid discharges by way of the peripheral overflow launder 12b from the tank.

A sludge pump 31 conveniently as well as economically located in the enlarged bottom portion or work room 15 of the hollow pier, has its intake end connected through sludge intake pipe 32 to the annular sump above. This pump discharges the collected sludge through pipe 33 which rises within the hollow pier and through the open central area of the annular drive head, then extends through a bend horizontally by way of the access bridge for delivery of the sludge to a point of disposal.

Figure 3:
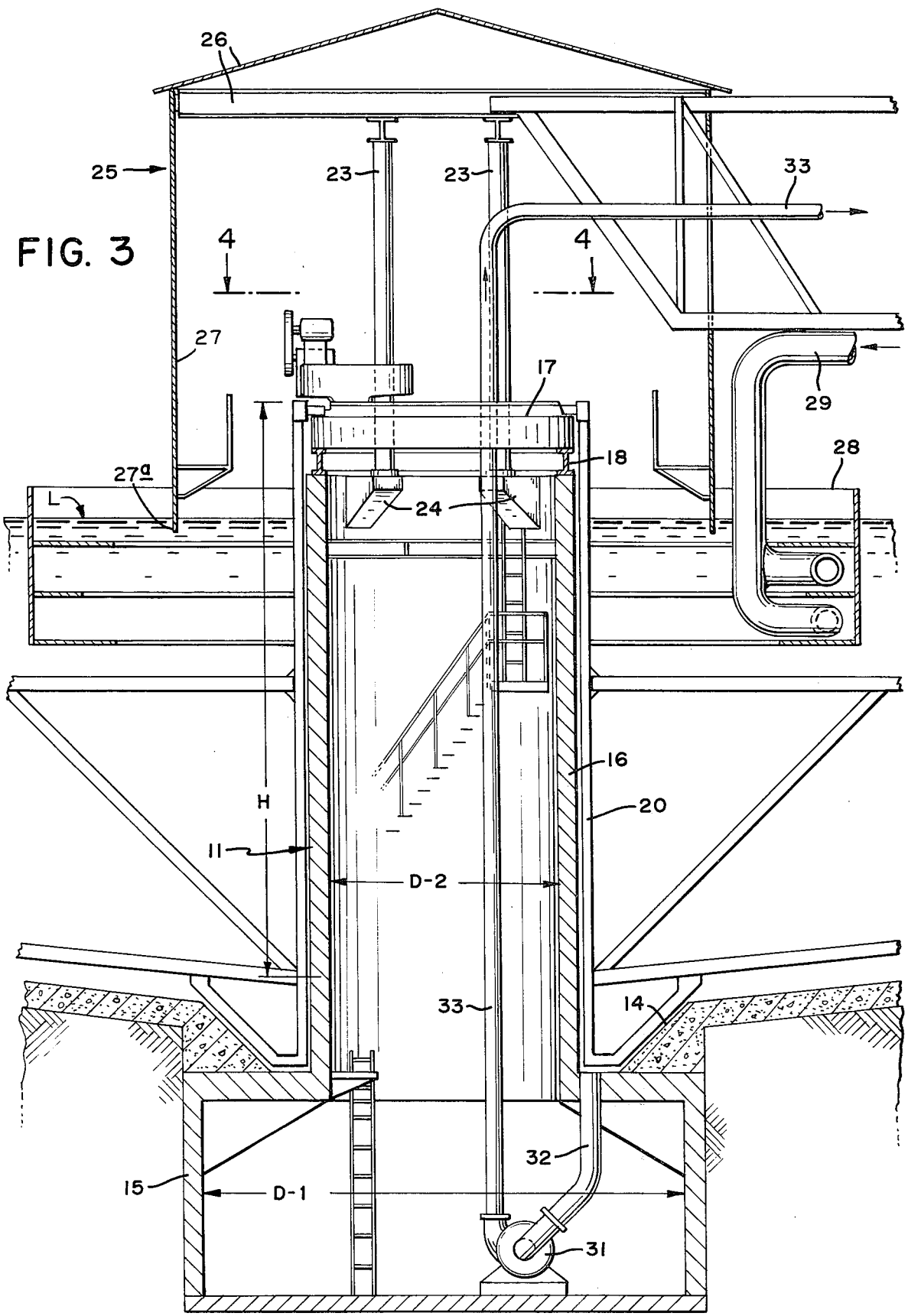
FIG. 3 is a greatly enlarged vertical sectional view derived from FIG. 1, of the center pier carrying the hydrostatic drive head embodying the invention.

One embodiment of the improved hydrostatic bearing construction, herein also termed hydrostatic drive head of this invention is illustrated in FIGS. 4 through 13, described as follows:

As shown in FIGS. 3 and 7, this drive head mounted atop the hollow pier by means of the aforementioned base ring 18, comprises a generally annular base structure or turntable base in the form of a single casting 34 of relatively simple profile or cross-sectional configuration.

This casting of the base structure 34, as shown more clearly in detail FIGS. 8, 9, and 10 comprises (in FIG. 10) an intermediate horizontal generally annular body portion or platform portion 35. Rising from this horizontal body portion are a plurality of concentric walls 36, 37, 38, and 39 of different heights, and constituting between them a corresponding number of annular troughs substantially concentric with one another and with the vertical axis of rotation of the rake structure.

Accordingly, an inner annular trough 40 is defined by the inner high wall 36 formed with inwardly directed flange 36a, and the next lower wall 37, which trough is for containing a bath of lubricating oil for the bull gear 21 (see also FIG. 7).

An intermediate annular trough 41 is formed by the wall 37 and by the third still lower annular wall 38. This trough is to have mounted and contained therein the hydrostatic bearing pads or blocks for the bull gear 21 as hereinafter furthermore to be described.

This intermediate annular trough 41 serves as a catch basin for spent hydrostatic pressure oil from the bearing pads, and has bottom openings 42 through which such spent oil may flow into an annular reservoir 43 (see also FIG. 7) formed mainly by the casting of the base structure itself, and furthermore to be described.

An outer annular peripheral trough or annular cup 44 is formed by the two lowest circular walls 38 and 39, and is provided for containing a sealing liquid for an outer liquid seal herein to be furthermore described.

The casting of the base structure 34 is furthermore formed with a pair of concentric walls 45 and 46 extending downwardly from the annular horizontal body portion 35 to constitute the aforementioned reservoir 43 closed (see FIG. 7) by a removable annular bottom plate 47. Detail FIG. 7a shows the manner in which this closure plate is boiled bolted 48 to the bottom of the casting and sealingly connected therewith. An oil tight seal is provided by a sealing compound 49 between the annular closure plate and annular shoulders 50 and 50a formed in the bottom faces of the base structure. An additional adhesively bonding sealing substance such as Epoxy may be applied in the concentric bottom grooves 51 and 52.

From FIGS. 8 and 9 it is to be seen that the casting of the base structure 34 is also formed with a pair of internally opposed inward bulges 53 and 54 as part of the inner upright wall 36, and in such a manner as to accommodate the mounting of a pair of pinion drive units 55 and 56 (see FIGS. 4 and 7) in driving engagement with the internally toothed bull gear 21, and furthermore to be described.

A number of hydrostatic pressure bearing pads constructed and arranged to provide vertical and radial hydrostatic bearing surfaces for the bull gear 21 (see FIGS. 7 to 10), are mounted upon respective prepared horizontal bottom faces 34a in the intermediate annular trough 41 of the base structure, and to communicate with oil pressure supply passages in the trough bottom. These passages in turn have oil pressure supply connections leading thereto. The hydrostatic oil pressure for this purpose, that is the weight supporting pressure, is derived from a separate pumping system (not shown) designed for delivering a high enough hydrostatic bearing pressure to support the vertical load of the rake structure.

In the present example or preferred embodiment, there are provided eight hydrostatic pressure bearing pads (See FIG. 8) designated alternatingly as "V" and "V and H". The designation "V" indicates that the respective bearing pads receive pressure oil supply for hydrostatically supporting their respective shares of the vertical load or weight of the rake structure. For the present purpose, these bearing pads may be termed the single purpose — or single action hydrostatic bearing pads.

The designation "V and H" indicates that the respective bearing pads are designed or constructed with passages for delivering from the high pressure pump system (not shown) the hydrostatic oil pressure required for sustaining the vertical load, and for delivering from a separate pump system (not shown) a lower hydrostatic radial bearing pressure such as will suffice for hydrostatically centering the rake structure during its rotation. Accordingly each of these bearing pads has a high pressure oil supply connection 58 for vertical hydrostatic load support, and a low pressure oil connection 59 providing the lower radially directed hydrostatic pressure. Thus it will be seen that this arrangement of the eight bearing pads provides eight evenly distributed points of high pressure hydrostatic bearing supports for the weight of the rake structure from the high pressure pump system, but only four points of radially directed hydrostatic bearing pressure supports provided from the low pressure pump system.

Referring now to FIG. 7, it is seen that the internally toothed bull gear 21 is formed with an outwardly extending annular overhang or rim portion 60. The underside of this rim portion is of specially shaped cross-sectional profile being recessed so as to accommodate the above described arrangement of the hydrostatic bearing pads.

Accordingly, this recess or profile comprises an horizontal inner face 61 cooperating with the upwardly facing hydrostatic pressure areas of load bearing pads, while an inner cylindrical face 62 cooperates with the radially effective hydrostatic pressure areas of the bearing pads, all within the intermediate annular trough 41 of the base structure.

The lower toothed portion of bull gear 21 is immersed in a bath of lubricating oil contained in the inner annular trough 40 of the base structure. An outer peripheral overhang 63 of the bull gear is shaped to cooperate with the outer peripheral trough 44 of the base structure in such a manner as to provide a liquid seal herein termed the outer lower seal designatd "S-1".

The annular top face of the rotating bull gear is sealed off against the stationary base structure by means of a generally annular flat adaptor member of annular plate 64 (see also FIGS. 7, 11 to 13) bolted to the aforementioned top flange 36a of the inner high wall 36 of the base structure. This adaptor ring or member provides an outward annular overhang constituting with the bull gear 21 a seal which may be of any suitable kind, be it liquid or any other type of seal, and herein termed the inner upper seal "S-2" (see FIG. 7).

The bull gear has weight supporting and torque transmitting connections 65 with the upper cage portion of the rake structure, as shown particularly in FIGS. 4 to 7.

In the present embodiment there are provided eight such weight and torque transmitting connections (see FIG. 4) evenly spaced from one another.

Each of these connections as shown in this example, comprises a two-pronged lug having a pair of parallel lugs or lug portions 66 and 67 unitary or integral with the top of the rim portion of the gear. These radially oriented lug portions receive between them the radially inwardly directed arm of a bracket member for connection with the rake structure.

That is to say, a bracket 68 bolted to the cage of the rake structure has an inwardly directed arm loosely confined between the lugs 66 and 67.

A weight supporting bolt or pin 68a extends through the lugs and through the interposed arm of the bracket member. A set screw 69 provided on each one of the respective pairs of lugs on the bull gear is operable in such a way as to insure torque transmitting contact between the bracket arm and the respective lug on the gear which is rotated by the aforementioned interbalanced pinion drive units 55 and 56.

With an adequate amount of laterial or axial play or tolerance provided between the lugs 66, 67 and the brackets 68, each of the set screws 69 will insure such torque transmitting contact, provided the brackets 68 are properly adjusted and positioned on the surrounding frame for torque transmitting contact between lugs 67 and brackets 68. The set screw may be locked as by a jam nut 70.

Adjustment and positioning of the brackets is achieved in a vertical plane as represented by the inner face of the associated frame member of the top end of the central cage portion of the rake structure. The brackets are then fixed in the thus adjusted position.

It should be understood that by way of reversal of parts, a single lug on the bull gear may cooperate with a two-arm bracket, with the lug confined between the two arms of the bracket. These torque transmitting and weight supporting connections are combinable also with drive heads having other, that is to say non-hydrostatic bearings.

Figure 2:
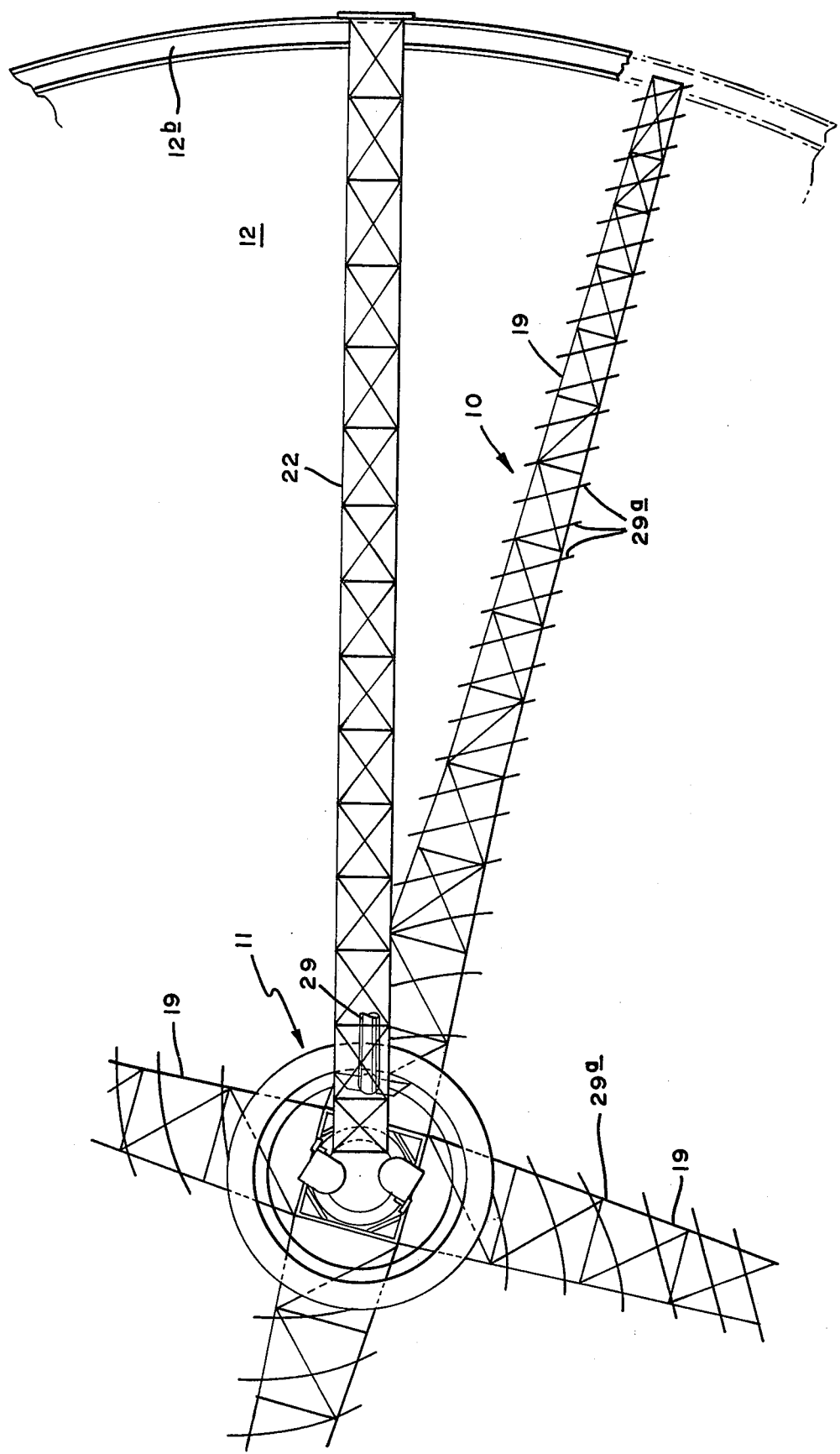
FIG. 2 is a plan view taken on line 2—2 in FIG. 1
Figure 4:
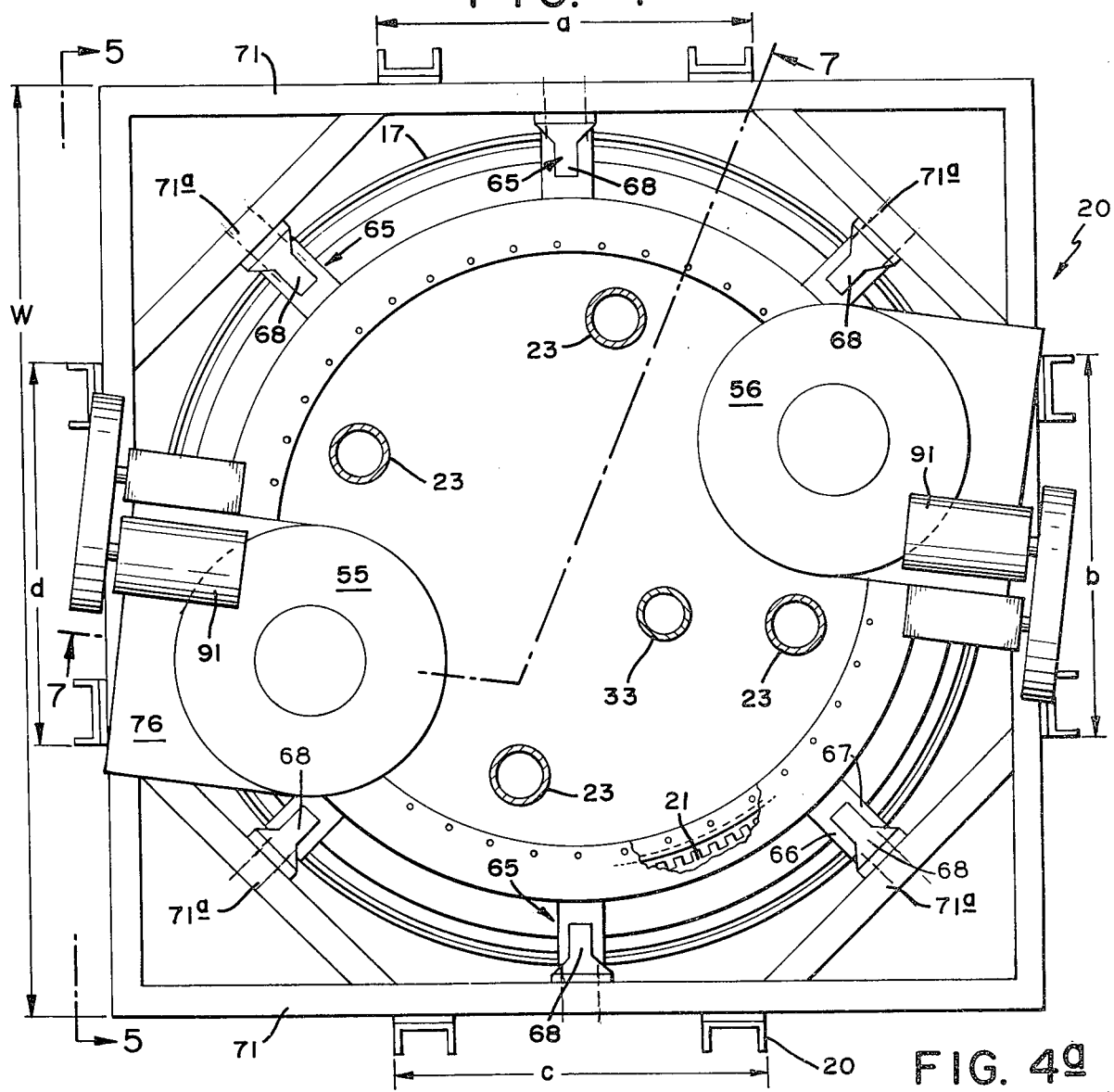
FIG. 4 is a further enlarged cross-sectional view taken on line 4—4 in FIG. 3, showing a top view of the drive head, and the arrangement of weight supporting and torque transmitting connections thereof with the surrounding cage portion of the rake structure.
Figure 4A:
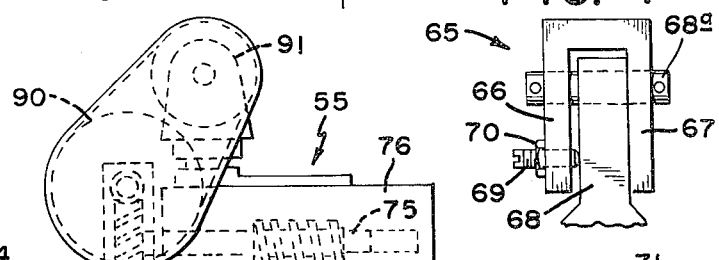
FIG. 4a is an enlarged detail view taken from FIG. 4, of one of said weight supporting and torque transmitting connections.
Figure 5:
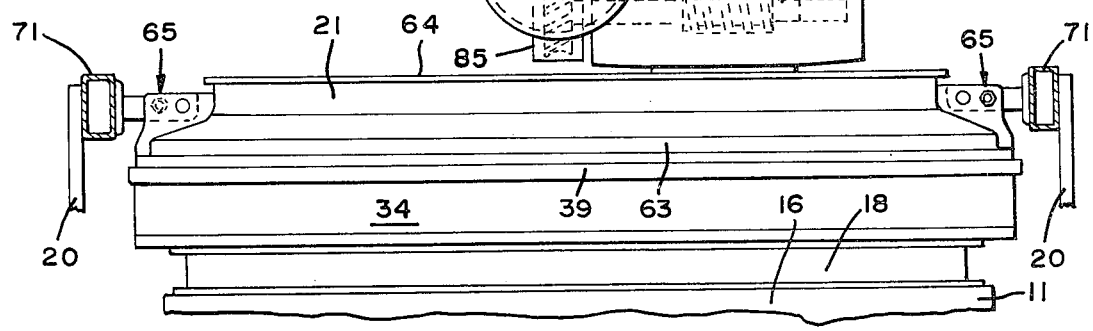
FIG. 5 is a side view of the drive head taken on line 5—5 in FIG. 4.

By reference to FIGS. 2, 3, and 4 it may be seen that the central cage portion 20 of the rake structure is in the form of a vertical box-shaped assembly of structural members, generally defined by its width "W" and its height "H". The upper terminal of this box shape is a square frame 71 (see FIG. 4) regidified by corner brace members 71a which together with the sides or frame members a, b, c, d of the square frame 71 represent a octagonal frame structure. This octogonal shape fairly circumscribes the bull gear 21 in such a manner that each member of the octagonal structure can be utilized as a base of the aforementioned weight supporting and torque transmitting connections 65. Accordingly, each of the side members of this octagonal structure has fixed to the inner face thereof a bracket 68 cooperatively connected to a respective pair of lugs 66 and 67 in the manner already described above. Whereas the combined torque transmitting and weight supporting means of this invention are herein shown in conjunction with an octagonal frame, other forms of the frame, such as square or polygonal may also be included.

Also, whereas a settling tank of concrete has been shown to illustrate the invention, an earthen basin may be substituted where desirable for instance for very large diameter tanks, or the tank may be a concrete and earthen combination.

The bull gear 21 and with it the rake structure are rotated by the aforementioned identical pair of pinion drive units 55 and 56, each of these drive units being mounted in the casting or base structure or turntable base 34 in the manner clearly shown in FIG. 7.

Each such pinion drive unit comprises a pinion 72 on pinion shaft 73, meshing with the internally toothed bull gear 21.

The upper end portion of the pinion shaft is connected to a worm gear 74 driven by worm shaft 75. This worm gear drive is surrounded by a housing 76 the bottom of which rests upon the plane or surface of the adaptor member 64, and is bolted partly to the aforementioned adaptor member 64 as at 77, and partly through the adaptor member to the flange 36a of the base structure as at 78.

The pinion shaft is guided at the lower end by a lower conical roller bearing 79 mounted in the base structure 34 as shown, and is held in place by the removable bottom plate 80. The upper end of the pinion shaft is guided in an upper conical roller bearing 79a mounted in the top portion of worm gear housing 76, and is held in place by the removable cover plate 81.

Referring to FIG. 6, one end 82 of worm shaft 75 is mounted in an axial thrust absorbing double conical roller bearing 83, the other end of the worm shaft being supported in a straight bearing 84.

A second gear reducing worm gear drive 85 is connected to the other end 86 of worm shaft 75, contained in an auxiliary housing 87 attached to the main worm gear housing 76. Accordingly, a small worm gear 88 fixed to worm shaft 75, is dirven by worm shaft 89. The worm shaft 89 has a drive sheave 90 (see also FIG. 5) which in turn is belt or chain driven from a motor 91 mounted on the main worm gear drive housing 76.

The motorized pinion drive units 55 and 56 may be interbalanced electrically or otherwise in any known manner, so that each of them will assume its half share of the driving torque required for rotating the rake structure against the sludge load in the tank.

The brackets 68 being connected to the lugs 66 and 67 by the pin 68a, may be bolted and fixed to the inner vertical faces of the respective associated sides or members of the octagonal frame, in such a manner and so positioned that torque transmitting contact is established between the brackets and the respective lugs 67. That is to say, the brackets 68 are adjustable in the respective vertical planes.

The drive head shown in FIG. 14 represents a modified embodiment differing from the one in FIG. 1 in that the hydrostatic load bearing pads 92 therein are provided with vertical inwardly facing hydrostatic bearing areas 93 along with upwardly facing horizontal bearing areas 94. These modified pressure bearing pads are mounted upon an annular support structure or turntable base 95 which in turn is constructed to accommodate an internally toothed bull gear 96 having an outer rim portion 96a.

This annular support structure shown to be a casting similar to the one in FIG. 7, comprises an horizontal annular body portion 97. A pair of concentric walls 98 and 99 extend downwardly from that body portion, constituting with an annular bottom closure plate 100 an annular reservoir "R" for hydrostatic pressure oil to be supplied to the pressure pads, as indicated by supply connection 101 and 102.

Upwardly from the annular body portion and along the inner periphery thereof extends an inner high upright wall 103. An intermediate lower wall 104 surrounding the high wall constitutes therewith a first or inner annular trough 104a adapted to contain a bath of lubricating oil for the bull gear 96. A still lower wall 105 surrounding the intermediate wall, constitutes therewith an intermediate annular trough 106 of the width W-1 containing the hydrostatic pressure pads 92 supplied with hydrostatic pressure oil by the supply connections 101 and 102. The trough 106 had drain holes 106a for spent hydrostatic pressure oil, to gravitate into reservoir "R". The wall 105, however, constitutes with a surrounding similar wall 107 a third or outer annular trough 108 for receiving a sealing liquid or medium, constituting part of a lower outer annular seal L-1.

The bull gear 96 driven by pinion 96b, differs from the one shown in FIG. 7, in that the underside of the rim portion 96a thereof is formed with an intermediate downward annular rib or partition 110. This partition defines a narrow downwardly open annular recess 111 accommodating the upright annular wall 104, and an outer annular recess 112 of rectangular cross sectional profile.

The outer recess 112 has an horizontal annular face 113 cooperating with the upwardly facing hydrostatic pressure areas of the load bearing pads, and has a cylindrical vertical face 114 cooperating with the radially inwardly facing vertical pressure areas of the hydrostatic pressure pads.

The rim portion 96a of the bull gear has along its outer periphery an annular overhang 96b cooperating with the outer annular trough 108 to constitute the aforementioned lower outer annular seal L-1.

An annular flat adaptor plate 115 is similar to the one shown in FIG. 7, being bolted to the inwardly directed top flange 103a of the high wall 103. This adaptor plate constitues with the annular top edge portion of the bull gear an upper inner seal L-2 similar to the one in FIG. 7.

The turntable base or support structure 95 in FIG. 14 is furthermore constructed and shaped to accommodate and mount a pinion drive unit 116 similar to the pinion drive units 55 and 56 illustrated in FIGS. 7 and 4.

Figure 16:
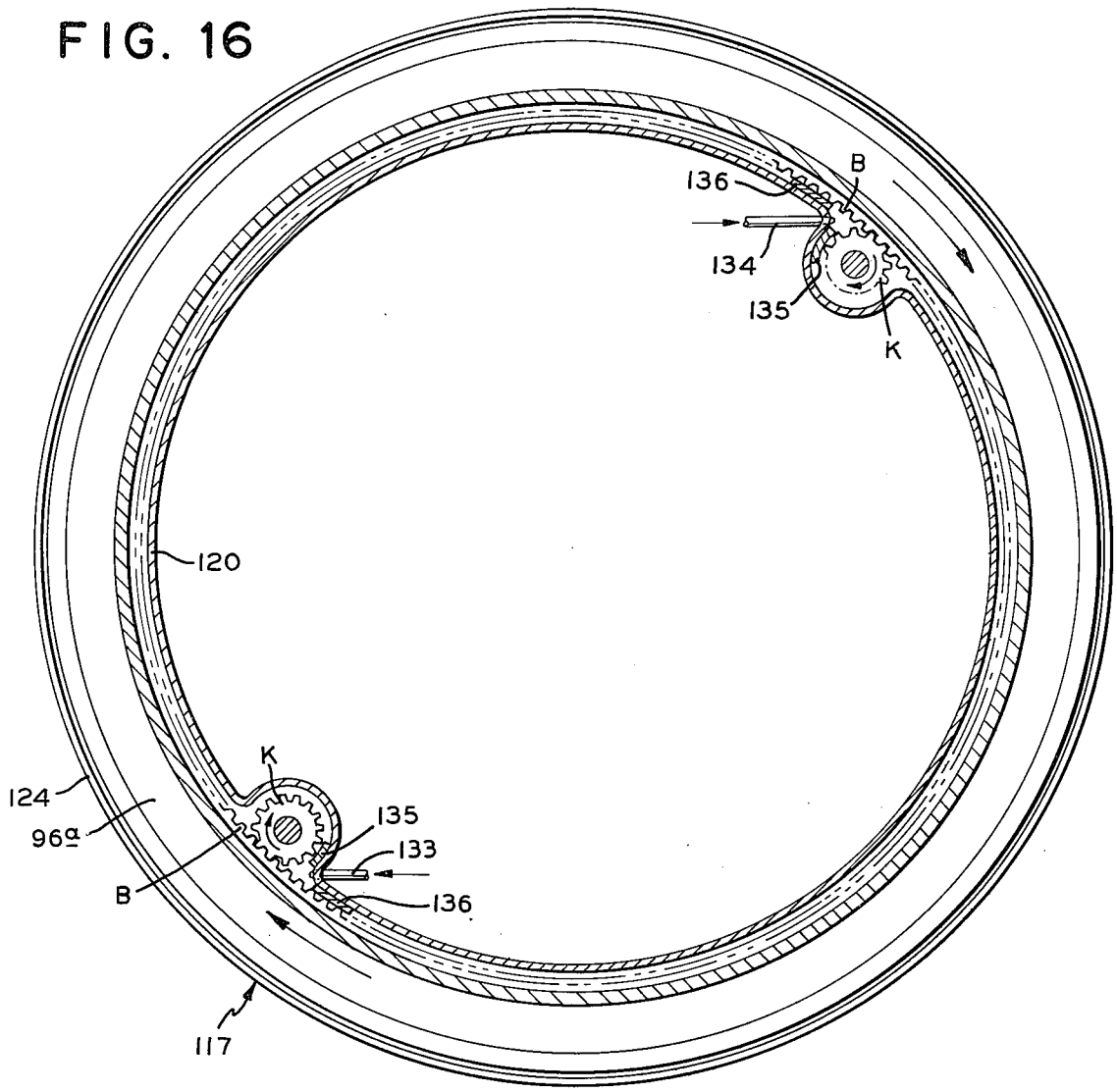
FIG. 16 is a cross-sectional view taken on line 16—16 of FIG. 15, showing oil emitting jet devices for lubricating the drive pinion engaging the internally toothed bull gear.
Figure 16A:
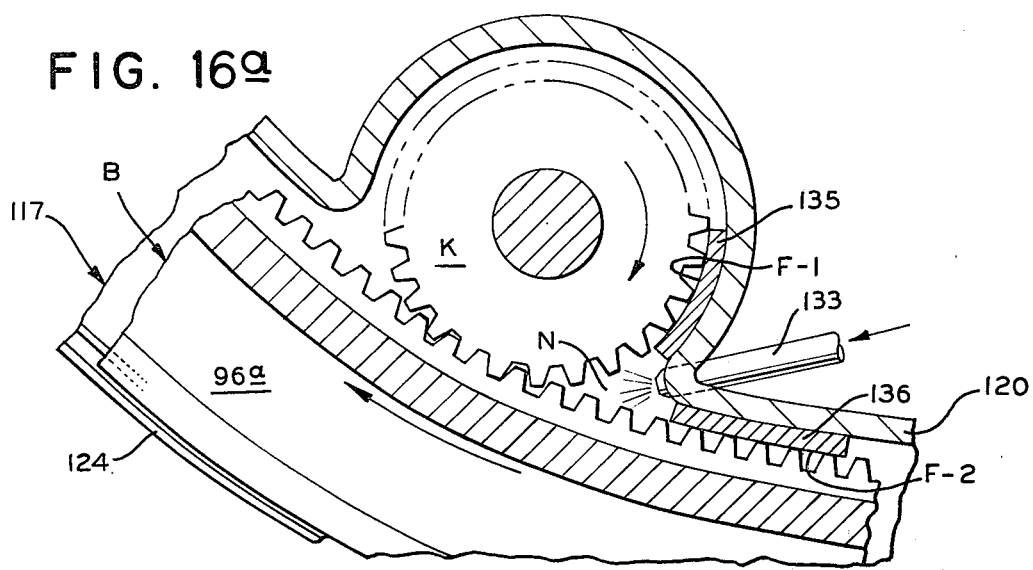
FIG. 16a is an enlarged fragmentary detail view taken from FIG. 16.

The drive head shown in FIGS. 15, 16, and 16a represents an embodiment differing from those in FIGS. 7 and 14, in that it combines the separate gear lubricating supply and the hydrostatic pressure oil supply into a simplified system employing a single oil for both purposes, irrespective of the fact that the hydrostatic horizontal balancing pressures between the bull gear and the pressure pads may be either radially inwardly or radially outwardly directed.

In order to meet this requirement, there is provided a turntable base or annular support structure which differs from those in the preceding embodiment in that both bull gear and the hydrostatic pressure pads are accommodated in the same annular trough. A single kind of dual purpose or wide spectrum oil is supplied to the pressure pads as well as to the drive pinions engaging the internally toothed portion of the gear. Spent oil collecting in this common trough, drains into the oil reservoir for recirculation.

Accordingly, a turntable base 117 in this embodiment comprises an horizontal annular body portion 118. Integral with the underside of this body portion is an annular oil reservoir 119 similar to those in the preceding embodiments, but with drain holes 119a for the spent oil that has served both for lubrication and for maintaining the hydrostatic bearing pressure.

Extending upwardly from the horizontal annular body portion is again an inner high wall 120 with its inwardly directed flange 121 having bolted thereto the flat annular adaptor plate 122. An outer low wall 123 extending along the outer periphery of the horizontal annular body portion defines with the inner high wall a wide annular trough designated by its width "W-2". Surrounding the low wall 123 is a similar low wall 124, both of these low walls between them constituting an annular trough 125 adapted to contain a sealing medium or liquid, and thus constituting part of a lower seal L-3 effective between the bull gear and the said body portion of the turntable base.

In keeping with the concept underlying the FIG. 15 embodiment, the underside of the bull gear "B" driven by pinion "K" is formed with a single downwardly open annular recess of rectangular profile, and shaped to accommodate therein the hydrostatic pressure pads 126. In this example, the annular recess has an inner cylinder face 127, cooperating with the radially inwardly facing vertical pressure areas 128 of the pressure pads. Along its outer periphery the bull gear is formed with an annular overhang 129 which with the annular sealing trough 125 constitues the aforementioned outer lower seal L-3 similar to those in the foregoing embodiments. Equally similar is an inner upper seal L-4 effective between the annular top edge of the bull gear and the annular adaptor plate 122.

In accordance with this concept, a suitable oil from the annular reservoir is supplied to both the hydrostatic pressure pads and to the gears. In this operation, the oil to be thus employed for a dual purpose, may be a selected normal oil such as recommended for parallel shaft type gears, an example of which is Mobil DTE Heavy Medium (290/300) or Extra Heavy (590/610), this representing the viscosity at 100° F in terms of SSU (i.e. Saybolt Second Units).

On the other hand, an oil bath to be maintained in trough "T" and suitable for the worm gear drive "W", is represented for example by an Extreme Pressure Type (EP) High Viscosity Oil such as Mobil Type 636 (aqMA8EP).

The operating oil from the annular reservoir is supplied under pressure to the hydrostatic pressure pads as indicated by the supply connections 130 and 131, as well as to the bull gear and to the drive pinions as by means of oil jetting or squirting devices indicated for example at 132 in FIG. 15, and at 133 and 134 in FIG. 16 and 16a. Additionally, an oil dam-or baffle device is shown in the entrance nip N formed between each pinion and the surrounding internally toothed gear.

This oil baffle device shown to be integral with the annular casting of the turntable base, comprises a pair of cooperating oil baffles 135 and 136. The baffle 135 has an effective curved concave face F-1 blanking off a corresponding portion of the pinion teethe adjacent to the nip N. The associated baffle 136 has an effective convex curved face F-2 blanking off a corresponding portion of the bull gear teeth adjacent to the nip N. The effect of these to cooperating baffles is that oil from a pool "P" trapped by the blanked off teeth, is forced into the confinement of the nip N and then with the aid of some capillary effects upwardly so as to lubricate teeth about to mesh with another.

This oil baffle device may operate using the available oil supply in the annular trough alone, or in combination with the oil supply from the oil jetting devices injecting oil into the nip.

I claim:
1. A sedimentation apparatus which comprises a tank, a center pier rising from the tank bottom, a rotary rake structure having a vertical cage portion surrounding said center pier and having rake arms extending from said cage portion, a stationary annular base structure mounted on said pier, and constructed and arranged to provide a first annular trough defined by a high first wall, and a substantially lower second wall spaced outwardly therefrom and concentric therewith, and adapted to contain a bath of lubricating oil, and to provide a second annular trough surrounding said first trough, and defined by said second lower wall and by a third wall surrounding said second wall, said second trough having discharge passages for spent hydrostatic pressure fluid, a set of hydrostatic pressure bearing pads mounted in said second trough, constructed and arranged so as to provide horizontal hydrostatic supporting areas adapted to cooperate with an annular horizontal load bearing surface, and to provide vertical radially effective hydrostatic bearing areas cooperating with a conforming cylindrical area unitary and rotating with said horizontal annular area, for centering and stabilizing the same, an internally toothed bull gear having a lower portion lodging in the oil bath of said first trough of the annular base structure, said bull gear having an outwardly extending rim portion the underside of which is formed with an annular recess shaped to provide said annular load bearing surface and said cylindrical stabilizing surface, lower sealing means effective between the outer peripheral edge portion of said rim portion of the bull gear and the adjacent annular edge portion of said base structure, upper sealing means effective between the annular top portion of the bull gear and the adjoining inner wall of said base structure, pressure means for supplying hydrostatic pressure fluid to said hydrostatic pressure pads, a drive pinion mounted in said base structure, in driving engagement with said bull gear, and connecting means effective between said rim portion of the gear and the top end of said cage portion, constructed and arranged for supporting said rake structure through said cage portion and for applying thereto the driving torque from said gear.

2. The apparatus according to claim 1, wherein said lower sealing means comprise an annular cup surrounding said third wall and unitary with said base structure, and an annular overhang extending peripherally from said rim portion of the bull gear, and formed to cooperate with said annular cup to constitute said sealing means.

3. Apparatus according to claim 1, wherein said base structure comprises an annular reservoir formed at the underside thereof, and communicating with said discharge passages for receiving spent hydrostatic pressure liquid.

4. Apparatus according to claim 1, wherein the top end of said vertical cage portion of the rake structure comprises a frame of at least four linear frame members surrounding said bull gear, and wherein said connecting means comprise a bracket extending inwardly from the middle portion of respective frame members, a lug integral with said bull gear, and arranged in torque transmitting relationship with said bracket, and means interconnecting said bracket and said lug, constructed and arranged for supporting the vertical load from said bracket.

5. Apparatus according to claim 1, wherein the top end of said vertical cage portion of the rake structure comprises a frame of at least four linear frame members surrounding said bull gear, and wherein said connecting means comprise a bracket extending inwardly from the middle portion of respective frame members, a lug integral with said bull gear, and arranged in torque transmitting relationship with said bracket, means interconnecting said bracket and said lug, constructed and arranged for supporting the vertical load from said bracket, and means for securing said torque transmitting relationship.

6. Apparatus according to claim 1, wherein the top end of said vertical cage portion comprises a frame of at least four linear frame members, surrounding said bull gear, and wherein said connecting means comprise a bracket arm extending inwardly from the middle portion of respective frame members, a pair of lugs integral with said bull gear and arranged to straddle said bracket arm in torque transmitting relationship therewith, an horizontal weight supporting pin extending transversely through said bracket arm and said lugs, and means for securing torque transmitting contact between said bracket arm and one of said lugs.

7. Apparatus according to claim 1, wherein the top of said vertical cage portion comprises a rectangular frame of square configurations surrounding said bull gear, and wherein said connecting means comprise a combined weight supporting said torque transmitting connection between said bull gear and the middle portion of each respective side of said frame.

8. Apparatus according to claim 1, wherein the top of said vertical cage portion comprises a polygonal frame surrounding said bull gear, and wherein said connecting means comprise a weight supporting connection between said bull gear and the middle portion of each respective side of each frame.

9. Apparatus according to claim 1, wherein the top end of said vertical cage portion of the rake structure comprises an octagonal frame surrounding said bull gear, and wherein said connecting means comprise a weight supporting and torque transmitting connection between said bull gear and the middle portion of each side of said octagonal frame.

10. Apparatus according to claim 1, wherein the top end of said vertical cage portion of the rake structure comprises an octagonal frame surrounding said bull gear, and wherein said connecting means comprise a weight supporting and torque transmitting connection between said bull gear and the middle portion of each side of said octagonal frame, and wherein said octagonal frame is formed by a rectangular frame of square configuration, and corner bracing members interconnecting each pair of mutually adjoining side members of said rectangular frame.

11. Apparatus according to claim 1, wherein the top end of said vertical cage portion comprises an octagonal frame surrounding said bull gear, and wherein said connecting means comprise a bracket arm extending inwardly from the middle portion of each side of said octagonal frame, a pair of parallel lugs integral with said bull gear and arranged to straddle said bracket arm in torque transmitting relationship therewith, and a horizontal weight supporting pin extending transversely through said bracket arm and said lugs.

12. Apparatus according to claim 1, wherein the top end of said vertical cage portion comprises a frame of at least four linear frame members surrounding said bull gear, and wherein said connecting means comprise a bracket extending inwardly from the middle portion of each side of said octagonal frame, means for connecting said bracket to the respective side member of the frame, whereby said bracket arm is adjustable in a vertical plane relative to said side member of the frame,
 a lug integral with said bull gear and arranged in torque transmitting relationship with said bracket,
 and means interconnecting said bracket and said lug, constructed and arranged to support the vertical load from said bracket.

13. Apparatus according to claim 1, wherein the top end of said vertical cage portion comprises a frame of linear frame members surrounding said bull gear, and wherein said connecting means comprise a bracket arm extending inwardly from the middle portion of each side of said octagonal frame, a pair of lugs integral with said bull gear and arranged to straddle said bracket arm in torque transmitting relationship therewith, a horizontal weight supporting pin extending transversely through said bracket arm and said lugs, and a set screw in one of said lugs operable for securing torque transmitting contact between said bracket arm and the other of said lugs.

14. Apparatus according to claim 1, wherein said pier comprises an open ended cylindrical portion rising from the tank bottom, with the addition of a work room of substantially larger cross-sectional area than that of the said cylindrical portion, located below the tank bottom and directly below said cylindrical portion, and accessible through the open bottom end of said cylindrical portion;
 and accessory equipment including a sludge pump located in said work room.

15. Apparatus according to claim 1, wherein said set of hydrostatic pressure bearing pads comprises bearing pads having horizontal hydrostatic pressure bearing area, as well radially outwardly facing hydrostatic pressure bearing area.

16. Apparatus according to claim 1, wherein said set of hydrostatic pressure bearing pads comprises bearing pads providing horizontal hydrostatic pressure bearing area, as well as radially effective hydrostatic pressure bearing area, and wherein said pressure means comprise means for supplying hydrostatic pressure to said horizontal area for supporting the vertical load, and means for supplying lower hydrostatic pressure to said radially effective pressure bearing area.

17. Apparatus according to claim 1, wherein, said set of hydrostatic pressure bearing pads comprises dual purpose bearing pads having an horizontal hydrostatic pressure bearing area, as well as a radially effective hydrostatic pressure bearing area, and single purpose bearing pads having an horizontal hydrostatic pressure bearing area, said dual purpose pads alternating with said single purpose pads.

18. Apparatus according to claim 1, wherein said set of hydrostatic pressure bearing pads comprises dual purpose bearing pads having an horizontal hydrostatic pressure bearing area, as well as a radially effective hydrostatic pressure bearing area, and single purpose bearing pads having an horizontal hydrostatic pressure bearing area, said dual purpose pads alternating with said single purpose pads, and wherein said pressure means comprise means for supplying hydrostatic pressure to said horizontal areas for supporting the vertical load, and means for supplying a lower hydrostatic pressure to said radially effective area.

19. Apparatus according to claim 1, wherein said pressure means comprise means for supplying hydrostatic pressure to said horizontal hydrostatic bearing areas for supporting the vertical load, and means for supplying a lower hydrostatic pressure to said radially effective hydrostatic bearing areas.

20. A sedimentation apparatus which comprises a tank, a center pier rising from the tank bottom, a rotary rake structure having a vertical cage portion surrounding said center pier and having rake arms extending from said cage portion, the top end of said cage portion being formed by an horizontal frame being composed of at least four linear frame members rigidly interconnected end to end so as to constitute the corners of the frame, said frame surrounding said rim portion of the gear, with the middle portion of said linear frame members spaced substantially equal radial distances outwardly from said rim portion,
- a stationary annular base structure mounted on said pier, and constructed and arranged to provide an annular trough,
- a internally toothed bull gear concentric with said base structure, said bull gear having an outwardly extending rim portion,
- annular bearing means for rotatably supporting said bull gear on said base structure concentrically therewith,
- a drive pinion mounted in said base structure, in driving engagement with said bull gear,
- and combined weight supporting and torque transmitting connections spaced evenly from one another between said bull gear and the middle of respective frame members, each said connection adapted to serve the dual purpose of transmitting driving torque to said rake structure, as well as supporting the vertical load of the rake structure.

21. The apparatus according to claim 20, wherein said frame is of octagonal shape formed by a rectangular frame of square configuration, and corner bracing members interconnecting each pair of mutually adjoining members of said rectangular frame.

22. The apparatus according to claim 20, wherein said frame is of square configuration.

23. The apparatus according to claim 20, wherein said transmitting means comprise a bracket extending inwardly from the middle portion of respective frame members, a lug integral with said bull gear, and arranged in torque transmitting relationship with said bracket, and means interconnecting said bracket and said lug, constructed and arranged for supporting the vertical load of the rake structure.

24. The apparatus according to claim 20, wherein said transmitting means comprise a bracket extending inwardly from the middle portion of respective frame members, a lug integral with said bull gear, adjustable means for establishing torque transmitting relationship of said lug with said bracket, means interconnecting said bracket and said lug, constructed and arranged for supporting the vertical load from said bracket, and means for securing said torque transmitting relationship.

25. A sedimentation apparatus which comprises a tank, a center pier rising from the tank bottom, a rotary rake structure having a vertical cage portion surrounding said center pier and having rake arms extending from said cage portion,
- a stationary annular base structure mounted on said pier, and comprising an horizontal annular flat bottom pinion, an external high wall extending along the inner periphery of said bottom portion, and having an inwardly directed flange, a substantially lower second wall spaced outwardly therefrom and concentric therewith, and defining with said bottom portion and with said high wall a first annular trough adapted to contain a bath of lubricating oil, and a third wall surrounding said second wall, and constituting with said bottom portion and with said second wall a second annular trough surrounding said first trough, and having discharge passages for spent hydrostatic pressure fluid, said inner high wall and bottom portion being formed with at least one inwardly directed bulge constructed and arranged for the reception and mounting thereon of a drive pinion defined below, and having an inwardly directed flange,
- a set of hydrostatic pressure bearing pads mounted in said second trough, constructed and arranged so as to provide horizontal hydrostatic supporting areas adapted to cooperate with an annular horizontal load bearing surface, and to provide vertical radially effective hydrostatic bearing areas cooperating with a conforming cylindrical area unitary and rotating with said horizontal annular area, for centering and stabilizing the cylindrical area,
- an internally toothed bull gear having a lower portion lodging in the oil bath of said first trough of the annular base structure, said bull gear having an outwardly extending rim portion the underside of which is formed with an annular recess shaped to provide said annular load bearing surface and said cylindrical bearing surface,
- lower sealing means effective between the outer peripheral edge portion of said rim portion of the bull gear and the adjacent peripheral edge portion of said annular bottom portion,
- a flat adaptor ring member having an outer circular contour and having an inner contour matching the contour of said inwardly directed flange of said high wall, means for detachably connecting the inner edge portion of said adaptor ring member to said flange, upper annular sealing means effective between the outwardly overhanging outer peripheral portion of said ring member and the top face of said bull gear, pressure means for supplying hydrostatic pressure fluid to said hydrostatic pressure pads, a drive pinion mounted in said bulge of the inner high wall of the base structure, and transmitting means effective between said rim portion of the gear and the top end of said cage portion, constructed and arranged for supporting the rake structure through said cage portion and for applying thereto the driving torque from the gear.

26. Apparatus according to claim 25, wherein said base structure is formed at the underside of said horizontal annular bottom portion thereof with an annular reservoir for receiving spent hydrostatic pressure oil through said discharge passage from said second annular trough.

27. Apparatus according to claim 25, wherein said lower annular seal comprises an annular cup integral with the outer peripheral edge portion of said horizontal bottom portion, and an annular overhang extending from the periphery of said rim portion of the bull gear, and constructed and arranged so as to cooperate with said annular cup to constitute said annular seal.

28. Apparatus according to claim 25, wherein said base structure is formed at the underside thereof with an annular reservoir for receiving spent hydrostatic pressure fluids.

29. Apparatus according to claim 25, wherein said base structure is formed at the underside thereof with an annular reservoir for receiving spent hydrostatic pressure fluid, said reservoir comprising a pair of cylindrical walls extending downwardly from said bottom substantially concentric with said base structure and with each other, and spaced from each other a distance constituting the cross-sectional width of the reservoir, an annular closure plate constituting the bottom of said annular reservoir, and means for detachably and sealingly fastening said annular closure plate to the respective lower end portion of said concentric walls.

30. A sedimentation apparatus which comprises a tank, a center pier rising from the tank bottom, a rotary rake structure having a vertical cage portion surrounding said center pier and having rake arms extending from said cage portion, a stationary annular base structure mounted on said pier, having an annular bottom portion, a high wall at the inner periphery of said bottom portion, an outer low wall at the outer periphery of said bottom portion, and constituting with said inner high wall an annular trough, having discharge passages for spent hydrostatic pressure oil, a set of hydrostatic pressure bearing pads mounted in said annular trough constructed and arranged so as to provide horizontal hydrostatic load supporting areas adapted to cooperate with an annular horizontal load bearing surface, and to provide vertical radially effective hydrostatic bearing areas cooperating with a conforming cylindrical area unitary and rotating with said annular horizontal area, for centering and stabilizing the same, an internally toothed bull gear surrounding said inner wall, and having an outwardly extending rim portion the underside of which is formed with an annular recess shaped to provide said annular load bearing surface and said cylindrical stabilizing surface, lower sealing means effective between the outer peripheral edge portion of said rim portion of the bull gear and the outer peripheral edge portion of said base structure, upper sealing means effective between the annular top portion of the bull gear and the adjoining said inner high wall of the base structure, pressure means for supplying hydrostatic pressure oil to said hydrostatic pressure pads, a drive pinion mounted in said base structure, in driving engagement with said bull gear, means providing lubrication by said oil for said bull gear and said pinion, and transmitting means effective between said rim portion of the gear and the top end of said cage portion, constructed and arranged for supporting said rake structure through said cage portion, and for applying thereto the driving torque from said gear.

31. A sedimentation apparatus which comprises a tank, a center pier rising from the tank bottom, a rotary rake structure having a vertical cage portion surrounding said center pier and having rake arms extending from said cage portion, a stationary annular base structure mounted on said pier, and constructed and arranged to provide a first annular trough defined by a high first wall, and a substantially lower second wall spaced outwardly therefrom and concentric therewith, and adapted to contain a bath of lubricating oil, and to provide a second annular trough surrounding said first trough, and defined by said second lower wall and by a third wall surrounding said second wall, said second trough having discharge passages for spent hydrostatic pressure fluid, a set of hydrostatic pressure bearing pads mounted in said second trough, constructed and arranged so as to provide horizontal hydrostatic supporting areas adapted to cooperate with an annular horizontal load bearing surface, and to provide vertical radially inwardly facing hydrostatic bearing areas cooperating with a conforming cylindrical area unitary and rotating with said horizontal annular area, for centering and stabilizing the same, an internally toothed bull gear having a lower portion lodging in the oil bath of said first trough of the annular base structure, said bull gear having an outwardly extending rim portion the underside of which is formed with a first annular recess shaped for accommodating therein said second wall of the base structure, and further formed with a second annular recess surrounding said first annular recess, and shaped to provide said annular horizontal load bearing surface and said cylindrical radially stabilizing surface cooperating with said radially inwardly facing hydrostatic bearing faces of the bearing pads;

lower sealing means effective between the outer peripheral edge portion of said rim portion of the bull gear and the adjacent annular edge portion of the base structure, upper sealing means effective between the annular top portion of the bull gear and the adjoining inner wall of said base structure, pressure means for supplying hydrostatic pressure fluid to said hydrostatic pressure pads, a drive pinion mounted in said base structure, in driving engagement with said bull gear, and connecting means effective between said rim portion of the gear and the top end of said cage portion, constructed and arranged for supporting said rake structure through said cage portion, and for applying thereto the driving torque from said gear.

* * * * *